United States Patent [19]
Leonard

[11] Patent Number: 5,709,402
[45] Date of Patent: Jan. 20, 1998

[54] ATTACHMENT FINGERS FOR AIRBAG MODULE COVER

[75] Inventor: Timothy J. Leonard, Stuttgart, Germany

[73] Assignee: Morton International, Inc., Chicago, Ill.

[21] Appl. No.: 681,813

[22] Filed: Jul. 29, 1996

[51] Int. Cl.$^6$ ............................................. B60R 21/16
[52] U.S. Cl. ............................. 280/728.2; 280/728.3
[58] Field of Search ......................... 280/728.2, 728.3, 280/731, 732

[56] References Cited

U.S. PATENT DOCUMENTS

| | | | |
|---|---|---|---|
| 5,167,427 | 12/1992 | Baba | 280/743.1 |
| 5,312,129 | 5/1994 | Ogawa | 280/728.2 |
| 5,439,246 | 8/1995 | Ravenberg et al. | 280/728.3 |
| 5,445,409 | 8/1995 | Abramczyk et al. | 280/728.2 |
| 5,607,179 | 3/1997 | Lenart et al. | 280/728.2 |

*Primary Examiner*—Kenneth R. Rice
*Attorney, Agent, or Firm*—George W. Rauchfuss, Jr.; Gerald K. White

[57] ABSTRACT

A module housing and a module cover for use as part of an airbag module. The module housing has a first sidewall and a second sidewall, and each sidewall includes an outwardly bent portion. A first apron extends downwardly from the outwardly bent portion of the first sidewall to a distal edge, and a second apron extends downwardly from the outwardly bent portion of the second sidewall to a distal edge. The first apron defines two spaced-apart slots and the second apron defines two spaced-apart slots. The module cover includes a lid, positioned over the module housing. A first and a second attachment finger each have a first segment extending downwardly from the lid to a transverse section. The transverse sections extend through, respectively, the two slots defined by the first apron. Second segments extend downwardly from the transverse sections to hooks caught on the distal edge of the first apron securing the first and the second attachment fingers to the first sidewall of the module housing. A third and a fourth attachment finger each have a first segment extending downwardly from the lid to a transverse section. The transverse sections extend through, respectively, the two slots defined by the second apron. Second segments extend downwardly from the transverse sections to hooks caught on the distal edge of the second apron securing the third and the fourth attachment fingers to the second sidewall of the module housing, whereby the module cover is secured to the module housing.

16 Claims, 4 Drawing Sheets

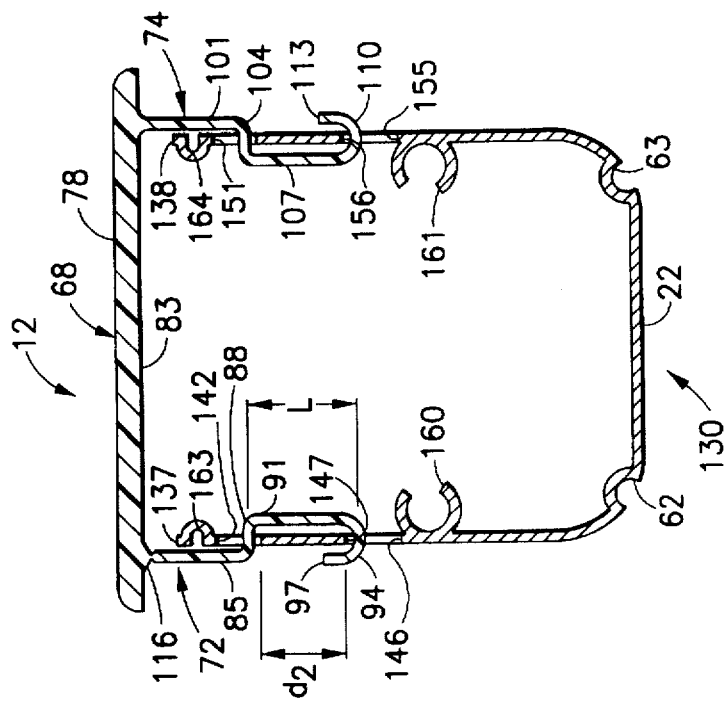
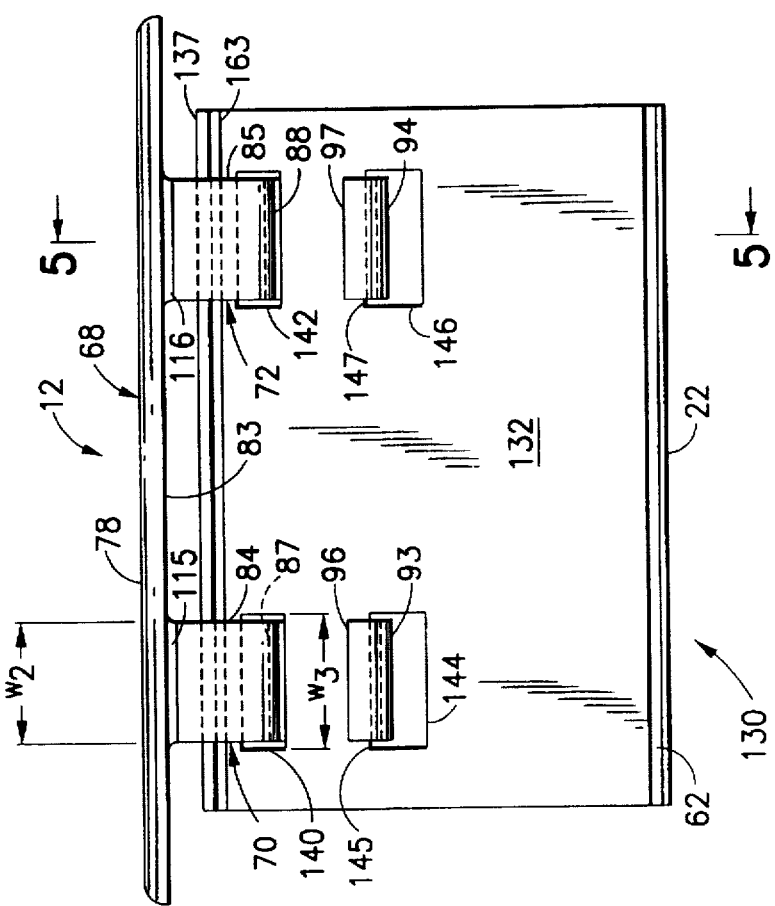
FIG. 5
FIG. 4

ATTACHMENT FINGERS FOR AIRBAG MODULE COVER

FIELD OF THE INVENTION

The present invention provides a module housing and a module cover for use as part of an airbag module and, more particularly, the present invention provides attachment fingers for attaching a module cover to a module housing.

BACKGROUND OF THE INVENTION

An airbag module is employed in an automobile for protecting an occupant against injury by deploying an inflated airbag cushion to physically restrain the occupant's body when the automobile encounters a collision. A passenger side airbag module normally includes a module cover attached to and covering the mouth of a trough-shaped module housing (or reaction canister) containing an inflator and an airbag cushion. The module cover includes at least one tear seam or weakened portion for allowing the airbag cushion to break through the cover during inflation of the airbag cushion resulting from a collision of the vehicle. For aesthetical purposes, the tear seam is ideally positioned on a hidden side or rear face of the module cover as opposed to a front face of the cover presented to a vehicle occupant. Since the airbag cushion inflates with great force and actually breaks through the module cover during deployment, it is important that the module cover be strongly secured to the module housing to resist becoming unattached during such a deployment. As with all automotive parts, the means for attaching the module cover to the module housing preferably will have a simple design and as few parts as possible.

In addition to being strongly secured to the module housing, the module cover should be able to move slightly with respect to the module housing. The ability to move slightly is helpful in mating the module cover to a dashboard or interior trim of a vehicle once the module housing is mounted to underlying vehicle structure in a fixed position. Preferably, the module should be able to move slightly up and down, side to side and end to end with respect to the module housing.

In some existing airbag modules, rivets or bolts are used to secure the module cover to the module housing. Such an attachment method provides a strong attachment, allows the tear seam to be positioned on the side of the module cover, and allows for a relatively simple design of the module cover. Using rivets or bolts, however, adds to the number of parts comprising the airbag module and complicates the assembly of the airbag module. In addition, using rivets or bolts does not normally allow the module cover to move slightly with respect to the module housing.

A general object, therefore, of the present invention is to provide a new and improved means for attaching a module cover to a module housing of an airbag module.

A more specific object of the present invention is to provide means for attaching a module cover to a module housing that will secure a module cover to an airbag module strongly enough to ensure that the module cover will remain attached during deployment of an airbag cushion through a tear seam of the module cover.

Another object of the present invention is to provide means for attaching a module cover to a module housing having a relatively simple design, that does not requiring additional parts such as rivets, bolts, clamping means or a band, for example, and that is relatively easy to assembly.

An additional object of the present invention is to provide means for attaching a module cover to a module housing that allows a tear seam to be positioned on a hidden side or rear face of the module cover.

A further object of the present invention is to provide means for attaching a module cover to a module housing that allows the module cover to move slightly with respect to the module housing.

SUMMARY OF THE INVENTION

In carrying out this invention, there is provided a module cover defining at least one tear seam. The module cover includes a lid having a first side edge and a second side edge, the first side edge generally opposite the second side edge. At least one attachment finger has a first segment extending downwardly from a bottom surface of the lid adjacent the first side edge to a transverse section. The transverse section extends generally perpendicular to the first segment and towards the second side edge, and a second segment extending downwardly from the transverse section to a hook curved away from the second side edge and upwardly to a distal end. At least one attachment finger has a first segment extending downwardly from a bottom surface of the lid adjacent the second side edge to a transverse section. The transverse section extends generally perpendicular to the first segment and towards the first side edge, and a second segment extends downwardly from the transverse section to a hook curved away from the first side edge and upwardly to a distal end. The at least one attachment finger extending from the lid adjacent the first side edge of the lid and the at least one attachment finger extending from the lid adjacent the second side edge of the lid are for securing the module cover to a module housing of an airbag module.

According to one aspect of the present invention the tear seam defined by the module cover is defined by the at least one attachment finger extending downwardly from the bottom surface of the lid adjacent the first side edge. According to another aspect of the present invention the tear seam defined by the module cover is defined by the bottom surface of the lid. The present invention, therefore, provides means for attaching a module cover to a module housing that allows a tear seam to be positioned on a hidden side or bottom face of the module cover.

The present invention also provides a module housing including a first sidewall and an opposed second sidewall extending upwardly from a bottom wall. The first sidewall includes a top portion, an outwardly bent portion extending generally perpendicular from the top portion and away from the second sidewall, and a first apron extending downwardly from the outwardly bent portion to a distal edge. The first apron defines at least one primary slot. The second sidewall includes a top portion and an outwardly bent portion extending generally perpendicular from the top portion and away from the first sidewall. A second apron extends downwardly from the outwardly bent portion of the second sidewall to a distal edge, and the second apron defines at least one primary slot.

The present invention additionally provides an airbag module including a module housing, a module cover, an airbag inflator and an inflatable airbag cushion. The module housing has a first sidewall and a second sidewall, generally opposite the first sidewall, extending upwardly from a bottom wall. Each of the first sidewall and the second sidewalls define at least one primary slot and an edge located below the at least one primary slot. The airbag inflator is secured within the module housing, and the inflatable airbag cushion is folded and secured within the module housing over the airbag inflator.

The module cover defines at least one tear seam and includes a lid positioned over the airbag cushion. The lid has a first side edge and an opposed second side edge. At least one attachment finger has a first segment extending downwardly from a bottom surface of the lid adjacent the first side edge to a transverse section. The transverse section extends generally perpendicular to the first segment, towards the second side edge and through the at least one primary slot defined by the first sidewall of the module housing. A second segment extends downwardly from the transverse section to a hook curved away from the second side edge and upwardly to a distal end. The hook is caught on the edge of the first sidewall securing the at least one attachment finger extending from adjacent the first side edge of the lid to the first sidewall of the module housing.

At least one attachment finger has a first segment extending downwardly from a bottom surface of the lid adjacent the second side edge to a transverse section. The transverse section extends generally perpendicular to the first segment, towards the first side edge and through the at least one primary slot defined by the second sidewall of the module housing. A second segment extends downwardly from the transverse section to a hook curved away from the first side edge and upwardly to a distal end. The hook is caught on the edge of the second sidewall securing the at least one attachment finger extending from adjacent the second side edge of the lid to the second sidewall of the module housing.

According to one aspect of the present invention a width of the at least one primary slot defined by the first sidewall is greater than a width of the at least one attachment finger extending from adjacent the first side edge of the lid. A length of the second segment of the at least one attachment finger extending from adjacent the first side edge of the lid is greater than a distance between the at least one primary slot defined by the first sidewall and the edge of the first sidewall positioned below the at least one primary slot. A width of the at least one primary slot defined by the second sidewall is greater than a width of the at least one attachment finger extending from adjacent the second side edge of the lid. Also, a length of the second segment of the at least one attachment finger extending from adjacent the second side edge of the lid is greater than a distance between the at least one primary slot defined by the second sidewall and the edge of the second sidewall positioned below the at least one primary slot. The present invention, therefore, strongly secures the module cover to the module housing yet allows the module cover to move slightly with respect to the module housing.

According to another aspect of the present invention the first sidewall of the module housing includes a top portion, an outwardly bent portion extending generally perpendicular from the top portion and a first apron extending downwardly from the outwardly bent portion to a distal edge. The first apron defines the at least one primary slot with the distal edge forming the edge of the first sidewall caught by the hook of the at least one attachment finger extending from adjacent the first side edge of the lid. The second sidewall of the module housing includes a top portion, an outwardly bent portion extending generally perpendicular from said top portion and a second apron extending downwardly from said outwardly bent portion to a distal edge. The second apron defines the at least one primary slot with said distal edge forming the edge of the second sidewall caught by the hook of the at least one attachment finger extending from adjacent the second side edge of the lid.

The invention together with further objects, features, advantages and aspects thereof, will be more clearly understood from the following description taken in connection with the accompanying drawings.

BRIEF DESCRIPTION OF THE DRAWINGS

FIG. 4 is a side plan view of another module housing and module cover according to the present invention;

FIG. 5 is a sectional view of the module housing and the module cover taken along the line 5—5 of FIG. 4.

The same reference numerals refer to the same elements throughout the various figures.

DETAILED DESCRIPTION OF THE INVENTION

Figure 1:
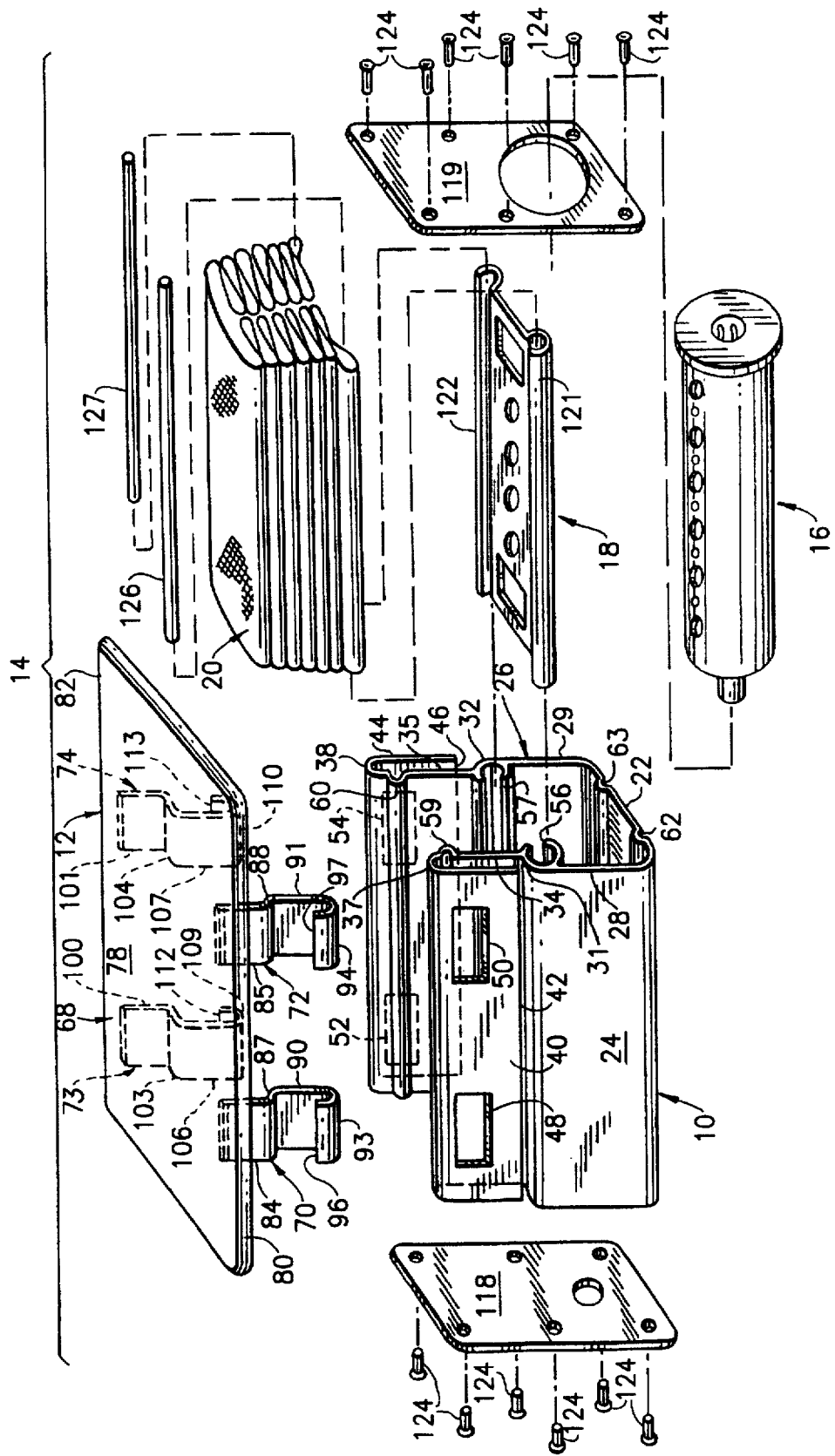
FIG. 1 is an exploded perspective side view of an airbag module including a module housing and a module cover according to the present invention.
Figure 3:
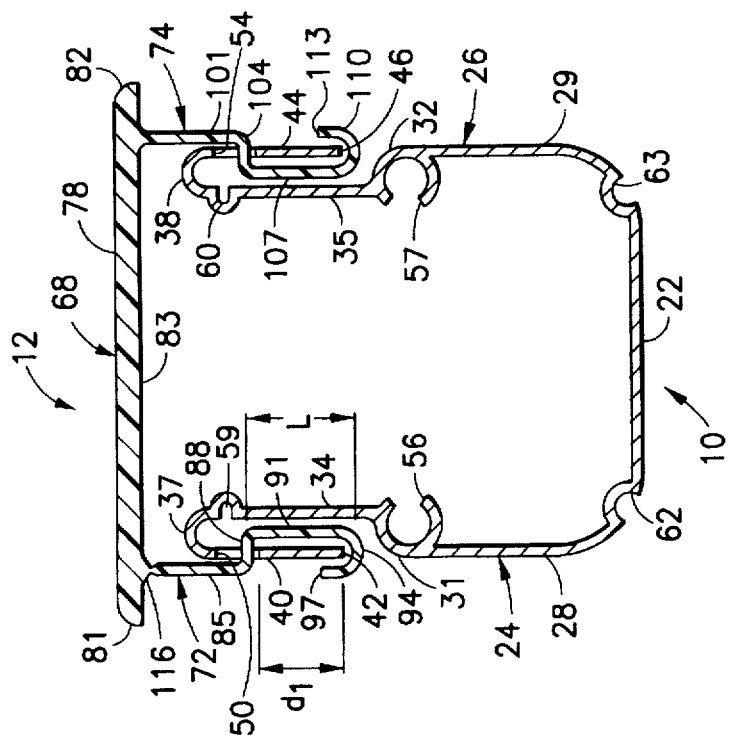
FIG. 3 is a sectional view of the module housing and the module cover taken along the line 3—3 of FIG. 2
Figure 2:
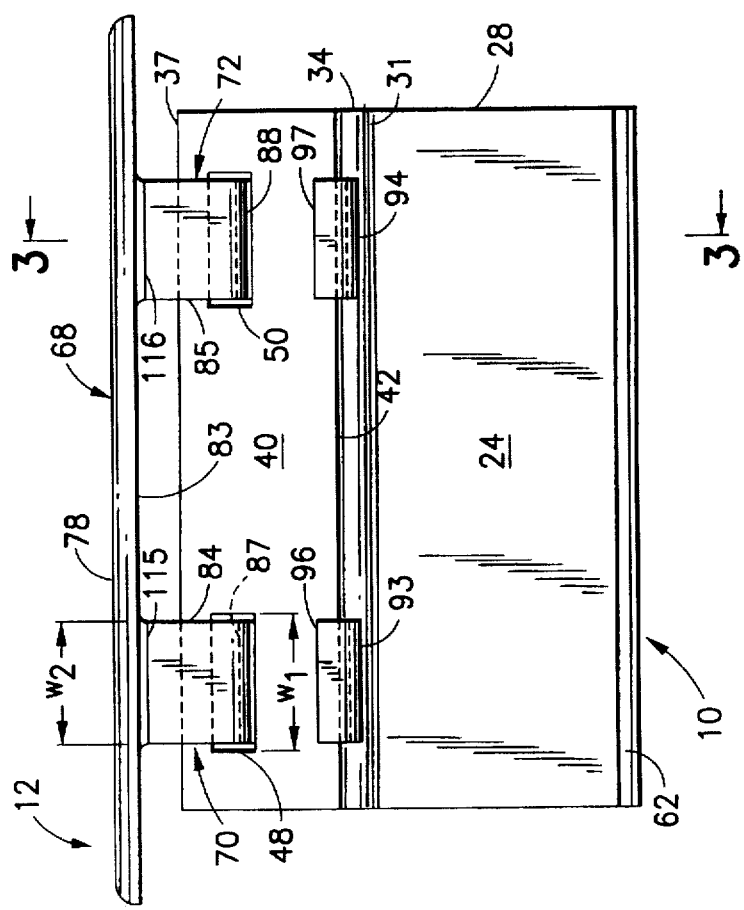
FIG. 2 is a side plan view of the module housing and the module cover of FIG. 1 assembled together.

Referring first to FIGS. 1 through 3, the present invention provides a module housing 10 and a module cover 12 for use as part of a passenger-side airbag module 14 and, more specifically, the present invention provides means for attaching the module cover to the module housing. The airbag module 14 also includes an inflator 16, a diffuser plate 18 and an inflatable airbag cushion 20, and is usually mounted within a dashboard of a motor vehicle in front of the passenger seat. Other parts of the airbag module 14 including the particular elements of the inflator 16, how the inflator generates gas and the remote sensors for triggering the inflator are all known in the art and, accordingly, are not described in detail as they do not in themselves constitute features of the present system. Only the components of the airbag module 14 related to the module housing 10 and the module cover 12 according to the present invention will be described in detail. Although the present invention is shown and described within a passenger-side airbag module, the present invention may be used in other types of airbag modules, such as a driver side or a side-impact airbag module for example.

The module housing 10 (also referred to in the art as a reaction canister) is generally trough-shaped and has a bottom wall 22, a first sidewall 24 and a second sidewall 26 forming a pair of open ends and an open top. The first sidewall 24 is opposite the second sidewall 26. Each sidewall 24,26 includes a bottom portion 28,29 extending upwardly from the bottom wall 22 to an inwardly bent portion 31,32 extending generally perpendicular from the bottom portion and into the module housing 10. A top portion 34,35 extends upwardly from the inwardly bent portion 31,32 so that the top portion is inwardly offset from the bottom portion 28,29. The first sidewall 24 also includes an outwardly bent portion 37 extending generally perpendicular from the top portion 34 and out of the module housing 10. A first apron 40 extends downwardly from the outwardly bent portion 37 to a distal edge 42, with the first apron being generally parallel to the top portion 34. The second sidewall 26 also includes an outwardly bent portion 38 extending generally perpendicular from the top portion 35 and out of the module housing 10. A second apron 44 extends downwardly from the outwardly bent portion 38 to a distal edge 46, with the second apron being generally parallel to the top portion 35. The first apron 40 defines a first and a second spaced-apart primary slots 48,50 and the second apron 44 defines a third and a fourth spaced-apart primary slots 52,54.

Two opposed, parallel mounting channels 56,57 are unitary, respectively, with the inwardly bent portions 31,32 of the first and the second sidewalls 24,26, and two opposed, parallel fastener channels 59,60 are unitary with the top portions 34,35 of the first and the second sidewalls. Two opposed, parallel fastener channels 62,63 are unitary with the bottom wall 22. The ends of the fastener channels 59,60,62,63 can be threaded for receiving screws. The module housing 10 can made from a suitable lightweight and rigid material such as a metal or an engineering plastic with or without reinforcement fillers, for example. Preferably the module housing 10 is made from aluminum and is formed by being extruded with the primary slots 48,50,52,54 being punched out of the extrusion, or the module housing is made of a suitable plastic and injection molded.

The module cover 12 is made of a suitable resiliently deformable material such as thermoplastic polyurethane, for example, and includes a lid 68 and four unitary, resiliently flexible attachment fingers 70,72,74,76. The lid 68, which substantially covers the open top of the module housing 10 and conceals and protects the contents of the module housing, is generally rectangular and has a top surface 78 that is presented to a vehicle occupant, a first side edge 80 and a second side edge 82. The first side edge 80 is opposite the second side edge 82.

The first attachment finger 70 and the second attachment finger 72 each have a first segment 84,85 extending downwardly from a bottom surface 83 of the lid 68 adjacent the first side edge 80 of the lid to a transverse section 87,88. The transverse sections 87,88 extend inwardly, generally perpendicular to the first segments 84,85, towards the second side edge 82 and through, respectively, the first and the second primary slots 48,50 defined by the first apron 40. Second segments 90,91 extend downwardly from the transverse sections 87,88, between and generally parallel to the first apron 40 and the top portion 34 of the first sidewall 24 to hooks 93,94 curved away from the second side edge 82 and upwardly to distal ends 96,97 of the first and the second attachment fingers 70,72. The hooks 93,94 are caught on the distal edge 42 of the first apron 40 securing the first and the second attachment fingers 70,72 to the first sidewall 24 of the module housing 10.

The third attachment finger 74 and the fourth attachment finger 76 are positioned generally opposite the first and the second attachment fingers 70,72 and each have a first segment 100,101 extending downwardly from a bottom surface 83 of the lid 68 adjacent the second side edge 82 of the lid to a transverse section 103,104. The transverse sections 103,104 of the third and the fourth attachment fingers 74,76 extend inwardly, generally perpendicular to the first segments 100,101, towards the first side edge 80 and through, respectively, the third and the fourth primary slots 52,54 defined by the second apron 44. Second segments 106,107 extend downwardly from the transverse sections 103,104, between and generally parallel to the second apron 44 and the top portion 35 of the second sidewall 26, to hooks 109,110 curved away from the first side edge 80 and upwardly to distal ends 112,113 of the third and the fourth attachment fingers 74,76. The hooks 109,110 are caught on the distal edge 46 of the second apron 44 securing the third and the fourth attachment fingers 74,76 to the second sidewall 26 of the module housing 10. More or less than four attachment fingers can be provided as long as at least one attachment finger is provided adjacent each opposing side edge 80,82 of the lid 68.

The attachment fingers 70,72,74,76 are secured to the module housing 10 by simply pulling or pushing the distal ends 96,97,112,113, second segments 90,91,106,107 and transverse sections 87,88,103,104 through the primary slots 48,50,52,54 until the distal ends clear, and the hooks 93,94, 109,110 catch, the distal edges 42,46 of the aprons 40,44. The thermoplastic attachment fingers 70,72,74,76 resiliently deform as they are pulled through the primary slots 48,50, 52,54 and then substantially retain their original form when positioned correctly on the aprons 40,44.

A width w1 of each of the primary slots 48,50,52,54 can be greater than a width w2 of each of the attachment fingers 70,72,74,76 (w1>w2), by about 4.0 millimeters for example, so that the module cover 12 can be moved slightly end-to-end with respect to the module housing 10. A length L of the second segments 90,91,106,107 of the attachment fingers 70,72,74,76 can also be greater than a distance d1 between the primary slots 48,50,52,54 and the distal edges 42,46 of the aprons 40,44 (L>d1), by about 4.0 millimeters for example, so that the module cover 12 can be moved slightly up and down with respect to the module housing 10. In addition, the resiliently flexible attachment fingers 70,72,74, 76 bend to allow the lid 60 to be moved slight side to side with respect to the module housing 10. The attachment fingers 70,72,74,76, therefore, strongly secure the lid 60 to the module housing and allow the lid 60 to be moved slightly in three directions with respect to the module housing 19. The lid 60 can be easily mated to a dashboard or trim of a vehicle after the module housing 10 has been rigidly mounted to vehicle structure underlying the dashboard.

If the top surface 78 of the lid 68 of the module cover 12 will be presented to a vehicle occupant, it is important that the top surface be aesthetically pleasing and blend in with a dashboard or trim of a vehicle as much as possible. The lid 68, therefore, can be provided with a class A, decorative, top surface 78 (class refers to the quality of the surface with regards to looks, texture and other factors, with class A being the best available surface quality). If, on the other hand, the lid 68 is used just as a protective cover for the airbag cushion and is not presented to a vehicle occupant, the lid will not be provided with a decorative cover. The module cover 12 also includes tear seams 115,116 which are located where the first and the second attachment fingers 70,72 meet the lid 68. The tear seams 115,116 allow an inflating airbag cushion to severe the first and the second attachment fingers 70,72 from the lid 68 so that the lid will pivot out of the way of an inflating airbag cushion about where the third and the fourth attachment fingers 74,76 meet the lid.

Figure 6:
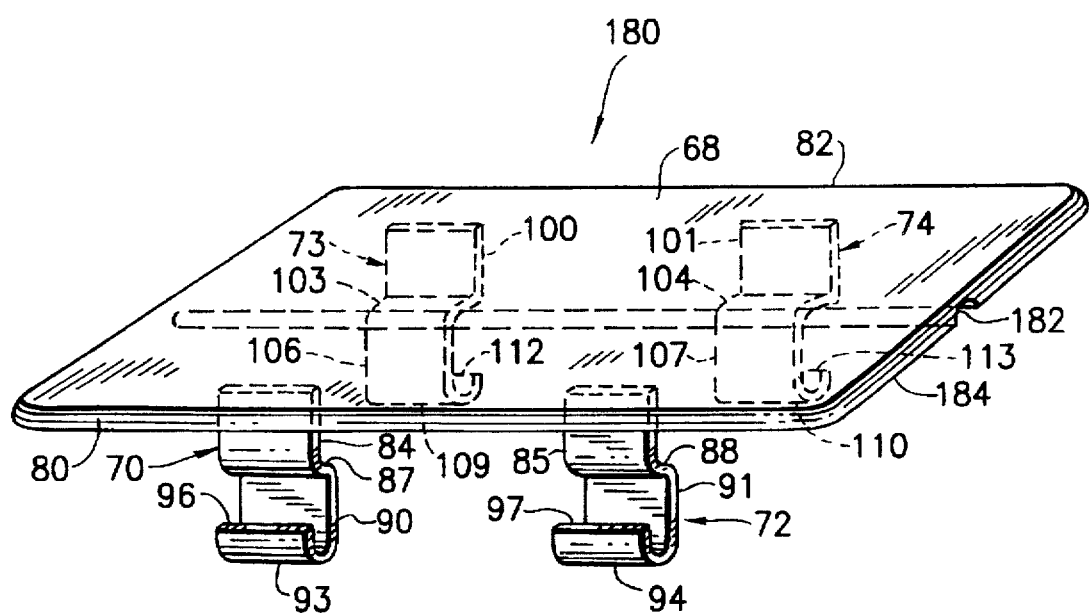
FIG. 6 is a side perspective view of an additional module cover according to the present invention.

Referring to FIG. 6, another module cover 180 according to the present invention is shown. The module cover 180 is similar to the module cover 12 of FIGS. 1 through 3 and elements that are the same have the same reference numerals. Instead of having tear seams defined by the first and the second attachment fingers 70,72, the module cover 180 includes a tear seam 182 that is defined by a bottom surface 184 of the lid 68. The tear seam 182 allows the lid 68 to split in half so that an inflating airbag cushion can pass therethrough.

Referring back to FIG. 1, the airbag inflator 16 is mounted within the module housing 10 adjacent the bottom wall 22 between opposing endplates 118,119, which close the open ends of the module housing 10, and below the parallel mounting channels 56,57 formed in the first and the second sidewalls 24,26 of the module housing. The diffuser 18 is mounted within the module housing 10 between the endplates 118,119 and above the inflator 16. The diffuser 18 includes a pair of opposite diffuser side tubes 121,122 positioned within the parallel mounting channels 56,57 of the module housing 10. The airbag cushion 20 is mounted within the module housing 10 above the diffuser 18 with cushion rods 126,127 securing the airbag cushion within the diffuser side tubes 121,122. The airbag module 14 is secured together by a plurality of screws 124 which extend through the endplates 118,119 into the fastener channels 59,60,62,63 formed in the module housing 10, and also the ends of the cushion rods 126,127. It should be noted that the module housing 10 can take many forms without departing from the scope and spirit of the present invention. The diffuser, for example, can be extruded unitary with the module housing.

Referring now to FIGS. 4 and 5, another module housing 130 according to the present invention is provided for use with the module cover 12. The module housing 130 does not have aprons. Instead, the module housing 130 has a first sidewall 132 and a second sidewall 133 that are opposed and extend upwardly from a bottom wall 135 to distal edges 137,138. The first sidewall 132 defines a first and a second spaced-apart primary slots 140,142 and a first and a second spaced-apart secondary slots 144,146 positioned below the primary slots. The transverse sections 87,88 of the first and the second attachment fingers 70,72 of the module cover 12 extend through, respectively, the first and the second primary slots 140,142, and the hooks 93,94 of the first and the second attachment fingers extend through the first and the second secondary slots 144,146 and are caught on top edges 145,147 of the secondary slots. The second sidewall 133 similarly defines a third and a fourth spaced-apart primary slots 151 and a third and a fourth spaced-apart secondary slots 155 positioned below the primary slots (the third primary slot and the third secondary slot are not shown but are similar to and positioned opposite the first primary slot and the first secondary slot). The transverse sections 103,104 of the third and the fourth attachment fingers 74,76 of the module cover 12 extend through, respectively, the primary slots 151, and the hooks 109,110 of the third and the fourth attachment fingers extend through the secondary slots 155 and are caught on top edges 156 of the secondary slots.

A width w3 of each of the primary slots 140,142,151 can be greater than the width w2 of each of the attachment fingers 70,72,74,76 (w3>w2), and the length L of the second segments 90,91,106,107 of the attachment fingers 70,72,74, 76 can be greater than a distance d2 between the primary slots 140,142,151 and the secondary slots 144,146,155 (L>d2). The module housing 130 also includes two opposed, parallel mounting channels 160,161 and two opposed, parallel fastener channels 163,164 unitary with the first and the second sidewalls 132,133, and two opposed, parallel fastener channels 166,167 unitary with the bottom wall 135, similar to the module housing 10 of FIGS. 1 through 3. In addition, the attachment fingers 70,72,74,76 of the module cover 12 can alternatively face inwardly so that the first segments 84,85,100,101 are located on the inside of the module housing 130 and the second segments 90,91,106,107 are located on the outside of the module housing.

The present invention, therefore, provides a novel, simple and effective means for attaching a module cover to a module housing. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A module cover defining at least one tear seam, the module cover comprising:

a lid having a first side edge and a second side edge, the first side edge opposite the second side edge;

at least one attachment finger having a first segment extending downwardly from a bottom surface of the lid adjacent the first side edge to a transverse section, the transverse section extending generally perpendicular to the first segment and towards the second side edge, and a second segment extending downwardly from the transverse section to a hook curved away from the second side edge and upwardly to a distal end of the finger; and at least one attachment finger having a first segment extending downwardly from a bottom surface of the lid adjacent the second side edge to a transverse section, the transverse section extending generally perpendicular to the first segment and towards the first side edge, and a second segment extending downwardly from the transverse section to a hook curved away from the first side edge and upwardly to a distal end of the finger.

2. A module cover according to claim 1 wherein:

the at least one attachment finger extending downwardly from the bottom surface of the lid adjacent the first side edge comprises two spaced-apart attachment fingers; and the at least one attachment finger extending downwardly from the bottom surface of the lid adjacent the second side edge comprises two spaced-apart attachment fingers.

3. A module cover according to claim 1 wherein the tear seam defined by the module cover is defined by the at least one attachment finger extending downwardly from the bottom surface of the lid adjacent the first side edge.

4. A module cover according to claim 1 wherein the tear seam defined by the module cover is defined by the bottom surface of the lid.

5. A trough-shaped module housing comprising:

a first sidewall and a second sidewall, generally opposite the first sidewall, extending upwardly from a bottom wall forming a pair of open ends and an open top;

the first sidewall includes a bottom portion extending upwardly from the bottom wall to an inwardly bent portion, the inwardly bent portion extending generally perpendicular from the bottom portion and towards the second sidewall, a top portion of the first sidewall inwardly offset from the bottom portion and extending upwardly from the inwardly bent portion, an outwardly bent portion extending generally perpendicular from the top portion and away from the second sidewall, and a first apron extending downwardly from the outwardly bent portion to a distal edge, the first apron defining at least one primary slot; and the second sidewall includes a bottom portion extending upwardly from the bottom wall to an inwardly bent portion, said inwardly bent portion extending generally perpendicular from said bottom portion and towards the first sidewall, a top portion of the second sidewall offset from the bottom portion and extending upwardly from said inwardly bent portion, an outwardly bent portion extending generally perpendicular from said top portion and away from the first sidewall, and a second apron extending downwardly from said outwardly bent portion to a distal edge, the second apron defining at least one primary slot.

6. A module housing according to claim 5 wherein the at least one primary slot defined by each of the first apron and the second apron comprises two spaced-apart primary slots.

7. An airbag module comprising:

A) a module housing having a first sidewall and a second sidewall, generally opposite the first sidewall, extending upwardly from a bottom wall, each of the first sidewall and the second sidewall defining at least one primary slot and an edge located below the at least one primary slot;

B) an airbag inflator secured within the module housing;

C) a folded, inflatable airbag cushion secured within the module housing over the airbag inflator; and D) a module cover defining at least one tear seam, the module cover comprising:

a lid positioned over the airbag cushion, the lid having a first side edge and a second side edge generally opposite the first side edge;

at least one attachment finger having a first segment extending downwardly from a bottom surface of the lid adjacent the first side edge to a transverse section, the transverse section extending generally perpendicular to the first segment, towards the second side edge and through the at least one primary slot defined by the first sidewall, and a second segment extending downwardly from the transverse section to a hook curved away from the second side edge and upwardly to a distal end of the finger, the hook caught on the edge of the first sidewall securing the at least one attachment finger extending from adjacent the first side edge of the lid to the first sidewall of the module housing; and at least one attachment finger having a first segment extending downwardly from a bottom surface of the lid adjacent the second side edge to a transverse section, the transverse section extending generally perpendicular to the first segment, towards the first side edge and through the at least one primary slot defined by the second sidewall, and a second segment extending downwardly from the transverse section to a hook curved away from the first side edge and upwardly to a distal end of the finger, the hook caught on the edge of the second sidewall securing the at least one attachment finger extending from adjacent the second side edge of the lid to the second sidewall of the module housing.

8. An airbag module according to claim 7 wherein the tear seam defined by the module cover is defined by the bottom surface of the lid.

9. An airbag module according to claim 7 wherein:

each sidewall of the module housing defines at least one secondary slot below the at least one primary slot, a top edge of the at least one secondary slot forming the edge of each sidewall caught by the hooks of the attachment fingers.

10. An airbag module according to claim 7 wherein:

the first sidewall of the module housing includes a top portion, an outwardly bent portion extending generally perpendicular from the top portion and a first apron extending downwardly from the outwardly bent portion to a distal edge, the first apron defining the at least one primary slot with the distal edge forming the edge of the first sidewall caught by the hook of the at least one attachment finger extending from adjacent the first side edge of the lid; and the second sidewall of the module housing includes a top portion, an outwardly bent portion extending generally perpendicular from said top portion and a second apron extending downwardly from said outwardly bent portion to a distal edge, the second apron defining the at least one primary slot with said distal edge forming the edge of the second sidewall caught by the hook of the at least one attachment finger extending from adjacent the second side edge of the lid.

11. An airbag module according to claim 10 wherein:

the first sidewall of the module housing includes a bottom portion extending upwardly from the bottom wall to an inwardly bent portion, the inwardly bent portion extending generally perpendicular from the bottom portion and towards the second sidewall, the top portion of the first sidewall extending upwardly from the inwardly bent portion; and the second sidewall of the module housing includes a bottom portion extending upwardly from the bottom wall to an inwardly bent portion, said inwardly bent portion extending generally perpendicular from said bottom portion and towards the first sidewall, the top portion of the second sidewall extending upwardly from said inwardly bent portion.

12. An airbag module according to claim 7 wherein:

the at least one primary slot defined by each of the first sidewall and the second sidewall comprises two spaced-apart primary slots;

the at least one attachment finger extending downwardly from the bottom surface of the lid adjacent the first side edge comprises two spaced-apart attachment fingers; and the at least one attachment finger extending downwardly from the bottom surface of the lid adjacent the second side edge comprises two spaced-apart attachment fingers.

13. An airbag module according to claim 7 wherein the tear seam defined by the module cover is defined by the at least one attachment finger extending downwardly from the bottom surface of the lid adjacent the first side edge.

14. An airbag module according to claim 7 wherein:

a width of the at least one primary slot defined by the first sidewall is greater than a width of the at least one attachment finger extending from adjacent the first side edge of the lid, and a length of the second segment of the at least one attachment finger extending from adjacent the first side edge of the lid is greater than a distance between the at least one primary slot defined by the first sidewall and the edge of the first sidewall positioned below the at least one primary slot; and a width of the at least one primary slot defined by the second sidewall is greater than a width of the at least one attachment finger extending from adjacent the second side edge of the lid, and a length of the second segment of the at least one attachment finger extending from adjacent the second side edge of the lid is greater than a distance between the at least one primary slot defined by the second sidewall and the edge of the second sidewall positioned below the at least one primary slot.

15. An airbag module according to claim 9 wherein:

a width of the at least one primary slot defined by the first sidewall is greater than a width of the at least one attachment finger extending from adjacent the first side edge of the lid, and a length of the second segment of the at least one attachment finger extending from adjacent the first side edge of the lid is greater than a distance between the at least one primary slot defined by the first sidewall and the at least one secondary slot positioned below the at least one primary slot; and a width of the at least one primary slot defined by the second sidewall is greater than a width of the at least one attachment finger extending from adjacent the second side edge of the lid, and a length of the second segment of the at least one attachment finger extending from adjacent the second side edge of the lid is greater than a distance between the at least one primary slot defined by the second sidewall and the at least one secondary slot positioned below the at least one primary slot.

16. An airbag module according to claim 10 wherein:

a width of the at least one primary slot defined by the first apron is greater than a width of the at least one attachment finger extending from adjacent the first side edge of the lid, and a length of the second segment of the at least one attachment finger extending from adjacent the first side edge of the lid is greater than a distance between the at least one primary slot defined by the first apron and the distal edge of the first apron; and a width of the at least one primary slot defined by the second apron is greater than a width of the at least one attachment finger extending from adjacent the second side edge of the lid, and a length of the second segment of the at least one attachment finger extending from adjacent the second side edge of the lid is greater than a distance between the at least one primary slot defined by the second apron and the distal edge of the second apron.

* * * * *